United States Patent Office 3,084,130
Patented Apr. 2, 1963

3,084,130
DRY COLD MOLDING COMPOSITION CONTAINING THERMOSETTING RESIN BINDER AND HYDRATED MINERAL ABSORBENT
John B. Painter, New Brunswick, N.J., assignor to Johns-Manville Corporation, New York, N.Y., a corporation of New York
No Drawing. Filed Dec. 2, 1959, Ser. No. 856,646
13 Claims. (Cl. 260—29.3)

This invention relates to an improved method of molding, and more particularly to an improved cold molding and consolidating technique for dry-mix mold furnish ingredients and products thereof.

More practical and effective cold molding techniques for particulate, thermally curable, dry molding compositions for the manufacture of friction elements, gaskets, bearings, spacers and the like products, are continuously sought in the molding field because of the inherent economies of time—particularly molding time—mixing, handling and equipment provided by cold molding and particulate dry-mix mold furnishes over the various more commonly employed techniques involving simultaneous molding and thermal curing, and/or the use of solvent dispersed mold furnishes. However, previously proposed cold molding procedures for discrete or particulate, thermally curable molding compositions or furnishes exhibit a common disadvantage, the necessity of extremely high, and thus often impractical and uneconomical forming or consolidating pressures to produce sufficient flow to fully and uniformly shape the dry furnish into the desired object and to impart adequate integrity and strength to the uncured object for subsequent handling, particularly factory or production handling techniques or procedures, prior to curing. High forming pressures, of course, require expensive and massive apparatus, among other disadvantages.

It is a primary object of this invention to provide a cold molding procedure for discrete, dry-mix mold furnish ingredients containing an uncured or incompletely cured thermosetting binder which provides for a substantial and material reduction in forming or consolidating pressures over those of conventional techniques.

It is a further object of this invention to provide an effective cold molding method or procedure which produces handleable, coherent forms or shapes from dry-mix mold furnish ingredients, containing an uncured or incompletely cured thermosetting binder, of equal or greater strength and integrity than products of comparable cold molding procedures, when utilizing forming or consolidating pressures 5 to 20 times below those of former methods.

It is a still further object of this invention to provide a cold molding procedure and a discrete, dry-mix mold furnish for said procedure which improves the inherently poor cold flow characteristics of particulate dry-mix mold furnishes and increases the strength or integrity of the resultant consolidated "green" or uncured shapes or forms rendering them fully handleable even for abusive factory practices.

It is also an object of this invention to provide an advantageous cold molding procedure for discrete, dry-mix mold furnish ingredients containing an uncured or partially cured thermosetting binder which permits substantial reductions in forming or consolidating pressures while improving flow characteristics of the discrete dry-mix furnish in the mold and the "green" or uncured strength and integrity of the resulting cold shaped and formed articles, without impeding other properties of the molded product, or the cost and/or effort of production.

This invention will be more fully understood and further objects and advantages thereof will become apparent from the hereinafter more detailed description and specific examples thereof.

It has been found that the foregoing stated objects, briefly, material reductions in molding or consolidating pressures while maintaining or improving cold mold flow characteristics and "green" strength and integrity of cold formed uncured dry-mix molded objects, may be readily achieved by incorporating in a typical dry-mix mold furnish, containing uncured or incompletely cured heat convertible or thermosetting binder material, a liquid in "dry" form by adding and dispersing throughout said particulate dry-mix mold furnish discrete, and to all appearances a dry mineral absorbent containing at least about 100% and preferably from about 200 to 500% by weight of absorbed water.

About 5%, for example, approximately 1 to 10%, and preferably approximately 3 to 6% by weight of discrete mineral absorbent containing at least about 100%, and preferably approximately 200 to 500% or more, of absorbed water, substantially uniformly distributed throughout a typical dry-mix furnish containing an uncured or incompletely cured thermosetting binder, results in a molding composition providing handleable, shape-retaining, coherent objects or forms of equal or greater strength and integrity than products of comparable cold molding procedures, when formed or consolidated with pressures approximately 5 to 20 times less than pressures previously required for comparable dry-mix mold furnishes. Although lesser quantities of liquid impart diminishing benefits more or less commensurate with the relative proportions of absorbed water and conventional dry-mix mold furnishes, amounts of mineral absorbent containing water substantially in excess of the preferred ratios do not provide benefits proportionate with increased quantities. Also, ratios in excess of about 1 part by weight of absorbent and water to 9 parts by weight of conventional dry-mix furnish should be avoided as greater adulteration may impede other properties of the molded product. Moreover, optimum proportions may vary somewhat depending upon the composition or balance of ingredients of the mold furnish, mold pressures, size and/or configuration of the molded object, etc., and thus may be precisely determined only by actual trial. Nevertheless, the stated objects and advantages of this invention can be accomplished by incorporating the preferred quantity or ratio, e.g., approximately 3 to 6% by weight of mineral absorbent containing about 200 to 500% by weight of absorbed water, in typical dry-mix mold furnishes for cold molding.

The discrete mineral absorbents or liquid carriers of this invention comprise "inert" or relative unreactive, highly absorbent cellular mineral materials such as synthetic hydrated calcium silicates, diatomaceous earth, or their equivalents having bulk densities of less than about 15 lbs./cu. ft. and which will absorb and retain at least 100% by weight of water, and preferably about 200 to 500% or greater by weight of water, while remaining discrete physical particles neither tacky nor coherent and dry in appearance and to the touch. Hydrothermally synthesized hydrated calcium silicates comprise the preferred mineral absorbents in that they exhibit liquid absorbent capacities up to 500% or more by weight. Particle size of the discrete mineral absorbent should be less than 100 microns in diameter, e.g., about 1 to 100 microns to achieve really effective absorption and distribution. Preferably, the absorbent mineral material should exhibit an average particle size of less than 325 mesh (44 microns), e.g., about 90% or more through 325 mesh.

The liquid component of the discrete dry additament for dry-mix thermosetting bonded mold furnishes consists simply of water. Common organic liquids are considered impractical and often inoperative due to their potential reactivity with, and/or solvent action upon many of the common components of conventional mold furnishes. Further, among other potential deleterious effects, organic liquids exhibit many commonly known hazardous properties, such as inflammability, toxicity, low boiling points, etc. Furthermore, compared to water, the cost of most organic materials would be more or less prohibitive.

The dry-mix cold moldable furnish or stock composition for the practice of this invention may be formulated or prepared in any suitable or conventional manner, typically blending or mixing the dry components in a mixer for particulate dry material. The mineral absorbent and water additament component can be prepared simply by combining the prescribed ratio of water with the discrete mineral absorbent, care being taken to prevent extensive agglomeration or sticking due to localized flooding. A preferred means of absorbing water upon porous mineral absorbent is to spray apply the liquid on the absorbent while agitating the latter to facilitate relatively uniform distribution. However, substantially any suitable or convenient means or method will suffice.

The hereinafter examples illustrate the improved molding procedure and suitable dry-mix thermosetting bonded mold furnish materials therefor. It is to be understood that the thermosetting binders, fillers—both fibrous and granular—pigments, friction particles or modifiers, and the like components of the conventional portions of the mold furnish compositions of these examples, products thereof and the molding techniques are all exemplary and not to be construed to limit the method or means of this invention to any specific product, configuration or composition recited in the examples, other than the novel and beneficial steps of adding and dispersing throughout a particulate dry-mix mold furnish a discrete mineral absorbent containing water.

EXAMPLE I

A dry-mix base stock for cold molding spacer elements for internal combustion engine components was prepared by dry blending the following in the stated proportions:

| Ingredients | Percent by Wt. | Batch |
| --- | --- | --- |
| Asbestos fiber | 69 | 14 lbs. 4 oz. |
| Phenol-formaldehyde resin | 30 | 7 lbs. 8 oz. |
| Carbon Black | 1 | 4 oz. |
| | 100 | 22 lbs. 0 oz. |

Four and one-half percent by weight, based upon the total foregoing dry-mix base stock, of a discrete, water containing, "dry" mineral absorbent comprising 3% by weight (12 oz.) of water and 1.5% by weight (6 oz.) of synthetic hydrated calcium silicate, sized 90% through 325 mesh, was added to and blended throughout the foregoing dry-mix base stock. Sixty-five gram charges of the discrete mineral absorbent and water containing dry-mix stock were placed in a cold deep cavity mold and each charge subjected to 3500 lbs. per square inch pressure for 5 seconds to consolidate and shape the stock into rectangular spacer element samples dimensioned about 2½" x 4" x .40". The resultant cold formed "green" or uncured spacer elements were fully and uniformly shaped and integrated, coherent and durable, exhibiting more than adequate strength for subsequent handling even by abusive factory or production techniques. These samples were then subjected to a thermal treatment comprising uniformly increasing the temperature of the same from ambient temperatures up to 350° F. over a 14 hour period and then maintaining the samples at a temperature of 350° F. for 5 hours to cure or convert the phenol-formaldehyde resin binder component through polymerization. The cured samples exhibited average specific gravities of 1.48 grams/cc. (92.2 lbs./cu. ft.), a hardness as measured with the Barcol Impresser (Barber-Coleman Company, Rockford, Illinois, Serial No. 934–1) of 40 and a Rockwell ¼" penetration with a 60 kg. load applied 10 seconds of 82 on scale L, and an average modulus of rupture of 10,380 lbs./sq. inch.

Cold forming of like shapes comprising identical dry-mix base stock as that set forth above but without the mineral absorbent and water additament required molding pressures of 15,000 to 60,000 lbs./sq. in. to produce "green" or uncured objects comparable in uniformity of shape and integration, durability and strength for subsequent handling, etc. Comparative determinations of identically prepared samples produced the data of the following table. All conditions were equal except those indicated.

| | Forming Pressures (lbs./sq. in.) | Avg. Modulus of Rupture (lbs./sq. in.) |
| --- | --- | --- |
| Samples of Example I | 3,500 | 10,380 |
| Samples of Identical Configuration and Composition Without Water and Absorbent. | 7,000 | 8,540 |
| | 10,000 | 9,700 |
| | 15,000 | 10,430 |
| | 20,000 | 10,360 |
| | 25,000 | 10,180 |
| | 35,000 | 10,650 |
| | 40,000 | 10,150 |
| | 50,000 | 11,450 |

When water in amounts of about 3% by weight was added in "dry" form to typical friction and bearing material furnishes or compositions for cold molding by incorporating and blending throughout each approximately 4.5% by weight, based upon the total of the dry-mix base furnish or composition, of a mineral absorbent and water additament consisting of 1 part by weight of synthetic hydrated calcium silicate or diatomaceous earth containing therein 2 parts by weight of absorbed water, reductions of cold molding pressures of from approximately 5 to 20 times were found to be practical without impeding essential or desirable properties and characteristics such as cold flow of the dry stock and in turn uniformity of composition, integrity, strength, durability and the like. The following represent and illustrate the application of the instant invention to typical friction and bearing material cold molding furnishes or compositions. The percentage by weight of the water and mineral absorbent additament is based upon the total weight of the dry-mix mold base stock or composition.

*Friction Material Composition*

EXAMPLE II

Ingredients: Percent by weight
- Phenol-formaldehyde resin ___ 12.2
- Rubber friction particle ___ 43.1
- Brass chips ___ 4.4
- Asbestos fiber ___ 36.1
- Carbon black ___ 1.4
- Graphite ___ 2.8

___
100.0

- Water ___ 3.0
- Hydrated calcium silicate ___ 1.5

___
104.5

EXAMPLE III

Ingredients:
- Urea-formaldehyde resin ___ 13.4
- Friction particle ___ 27.5
- Brass chips ___ 8.5
- Asbestos fiber ___ 39.0
- Carbon black ___ 0.5
- Graphite ___ 1.0
- Modifying agents ___ 10.0

___
100.0

- Water ___ 3.0
- Diatomaceous earth ___ 0.75
- Hydrated calcium silicate ___ 0.75

___
104.5

*Friction Material Composition*—Continued

EXAMPLE IV

Ingredients: Percent by weight

| | |
|---|---|
| Phenol-formaldehyde resin | 12.2 |
| Rubber friction particle | 43.1 |
| Brass chips | 4.4 |
| Asbestos fiber | 36.1 |
| Carbon black | 1.4 |
| Graphite | 2.8 |
| | 100.0 |
| Water | 2.0 |
| Diatomaceous earth | 1.5 |
| | 103.5 |

EXAMPLE V

Ingredients:

| | | |
|---|---|---|
| Hard rubber-resin matrix | | 15.0 |
|   Butadiene-acrylonitrile powdered rubber (Buna GR–N) | 3.0% | |
|   Powdered thermosetting cashew nut shell oil modified phenol-aldehyde resin | 1.5 | |
|   Sulphur | 1.5 | |
|   Litharge | 4.5 | |
|   Zinc oxide | 3.5 | |
|   Carbon black | 1.0 | |
| Metal chips | | 50.0 |
| Hard rubber friction particles | | 23.0 |
| Asbestos fibers | | 12.0 |
| | | 100.0 |
| Water | | 3.0 |
| Hydrated calcium silicate | | 1.5 |
| | | 104.5 |

*Bearing Material Composition*

EXAMPLE VI

Ingredients:

| | |
|---|---|
| Phenol-formaldehyde resin | 20.0 |
| Asbestos fiber | 30.0 |
| Graphite | 50.0 |
| | 100.0 |
| Water | 3.0 |
| Hydrated calcium silicate | 1.5 |
| | 104.5 |

It is to be understood that this invention does not consist of, nor include any specific or new dry-mix mold furnish compositions per se but merely the application of an enhancing treatment or component—the addition of a liquid in "dry" form—to conventional mold furnishes or stock compositions which contain heat convertible or thermosetting binder components, and the resultant product thereof, viz., mold furnishes which contain approximately 1 to 10% by weight of a mineral absorbent containing about 100 to 500% or more of water. Applicant accordingly claims no novelty in any of the specific and conventional mold furnish or stock ingredients such as thermosetting or heat convertible binders, fillers—either granular or fibrous—pigments, plasticized modifiers, etc., except the hereinbefore defined material absorbents and water additament.

It is also to be understood that the expressions "thermosetting binder," "thermosetting plastic," etc. include conventional natural and/or synthetic thermosetting or heat convertible or vulcanizable binder components for molding compositions which may be utilized in discrete dry granular or particulate form and include, for example, modified and unmodified natural and synthetic resins, modified and unmodified natural and synthetic rubbers and elastomers (i.e., polymers with rubber-like characteristics). Further, the term "uncured" as used in the claims is intended to include incompletely cured thermosetting binders as many commonly utilized plastic or resin binder materials are in an intermediate stage or partially polymerized, etc.

It is to be noted that the present disclosure is for the purpose of illustration only and that this invention includes all modifications and equivalents which fall within the scope of the appended claims.

What I claim is:

1. In a cold molding procedure for dry-mix, thermosetting mold compositions which comprises consolidating particulate dry-mix mold ingredients including thermosetting organic plastic binder in a cold mold to shape and integrate the same, removing the resulting shape-retaining, coherent object from the cold mold and then curing the binder component thereof by subjecting the molded object to a temperature, and for a period thereof sufficient to convert the thermosetting organic plastic binder component into an insoluble, infusible form, the improvement which comprises incorporating in the particulate dry-mix mold ingredients discrete unreactive mineral absorbent carrier containing from about 100 to 500% by weight of absorbed water, said mineral absorbent and absorbed water additament being added in amount of approximately 1 to 10% by weight of the total furnish.

2. In a cold molding procedure for dry-mix, thermosetting mold compositions which comprises consolidating particulate dry-mix mold ingredients including thermosetting organic plastic binder in a cold mold to shape and integrate the same, removing the resulting shape-retaining, coherent object from the cold mold and then curing the binder component thereof by subjecting the molded object to a temperature, and for a period thereof sufficient to convert the thermosetting organic plastic binder component into an insoluble, infusible form, the improvement which comprises incorporating in the particulate dry-mix mold ingredients discrete unreactive mineral absorbent carrier containing from about 200 to 500% by weight of absorbed water, said mineral absorbent and absorbed water additament being added in amount of approximately 1 to 10% by weight of the total furnish.

3. In a cold molding procedure for dry-mix, thermosetting mold compositions which comprises consolidating particulate dry-mix mold ingredients including thermosetting organic plastic binder in a cold mold to shape and integrate the same, removing the shape-retaining, coherent object from the cold mold and then curing the binder component thereof by subjecting the molded object to a temperature and for a period thereof sufficient to convert the thermosetting organic plastic binder component into an insoluble, infusible form, the improvement which comprises incorporating in the particulate dry-mix mold ingredients discrete unreactive mineral absorbent carrier selected from the group consisting of hydrated calcium silicates and diatomaceous earth and mixtures thereof containing from about 200 to 500% by weight of absorbed water, said mineral absorbent and absorbed water additament being added in amount of approximately 1 to 10% by weight of the total furnish.

4. In a cold molding procedure for dry-mix, thermosetting mold compositions which comprises consolidating particulate dry-mix mold ingredients including thermosetting organic plastic binder in a cold mold to shape and integrate the same, removing the shape-retaining, coherent object from the cold mold and then curing the binder component thereof by subjecting the molded object to a temperature, and for a period thereof sufficient to convert the thermosetting organic plastic binder component into an insoluble, infusible form, the improvement which comprises incorporating in the particulate dry-mix mold ingredients discrete mineral absorbent carrier selected from the group consisting of hydrated calcium silicates and diatomaceous earth and mixtures thereof containing from about 200 to 500% by weight of absorbed water, said mineral absorbent and absorbed water additament being added in amount of approximately 3 to 6% by weight of the total furnish.

5. In a cold molding procedure for dry-mix, thermosetting mold compositions which comprises consolidating particulate dry-mix mold ingredients including thermosetting organic plastic binder in a cold mold to shape and integrate the same, removing the shape-retaining, coherent object from the cold mold and then curing the binder component thereof by subjecting the molded object to a temperature, and for a period thereof sufficient to convert the thermosetting organic plastic binder component into an insoluble, infusible form, the improvement which comprises incorporating in the particulate dry-mix mold ingredients discrete mineral absorbent carrier selected from the group consisting of hydrated calcium silicates and diatomaceous earth and mixtures thereof containing from about 200 to 500% by weight of absorbed water, said mineral absorbent and absorbed water additament being added in amount of about 5% by weight of the total furnish.

6. In a cold molding procedure for dry-mix, thermosetting mold compositions which comprises consolidating particulate dry-mix mold ingredients including thermosetting organic plastic binder in cold mold to shape and integrate the same, removing the resulting shape-retaining, coherent object from the cold mold and then curing the binder component thereof by subjecting the molded object to a temperature, and for a period thereof sufficient to convert the thermosetting organic plastic binder component into an insoluble, infusible form, the improvement which comprises incorporating in the particulate dry-mix mold ingredients discrete hydrated calcium silicate containing from about 200 to 500% by weight of absorbed water, said hydrated calcium silicate and absorbed water additament being added in amount of approximately 1 to 10% by weight of the total furnish.

7. In a cold molding procedure for dry-mix, thermosetting mold compositions which comprises consolidating particulate dry-mix mold ingredients including thermosetting organic plastic binder in a cold mold to shape and integrate the same, removing the resulting shape-retaining, coherent object from the cold mold and then curing the binder component thereof by subjecting the molded object to a temperature, and for a period thereof sufficient to convert the thermosetting organic plastic binder component into an insoluble, infusible form, the improvement which comprises incorporating in the particulate dry-mix mold ingredients discrete hydrated calcium silicate containing from about 200 to 500% by weight of absorbed water, said hydrated calcium silicate and adsorbed water additament being added in amount of approximately 3 to 6% by weight of the total furnish.

8. In a cold molding procedure for dry-mix, thermosetting mold compositions which comprises consolidating particulate dry-mix mold ingredients including thermosetting organic plastic binder in a cold mold to shape and integrate the same, removing the resulting shape-retaining, coherent object from the cold mold and then curing the binder component thereof by subjecting the molded object to a temperature, and for a period thereof sufficient to convert the thermosetting organic plastic binder component into an insoluble, infusible form, the improvement which comprises incorporating in the particulate dry-mix mold ingredients discrete hydrated calcium silicate containing from about 200 to 500% by weight of absorbed water, said hydrated calcium silicate and absorbed water additament being added in amount of about 5% by weight of the total furnish.

9. In a cold molding procedure for dry-mix, thermosetting mold compositions which comprises consolidating particulate dry-mix mold ingredients including thermosetting phenol-formaldehyde resin binder in a cold mold to shape and integrate the same, removing the resulting shape-retaining, coherent object from the cold mold and then curing the binder component by subjecting the molded object to a temperature, and for a period thereof sufficient to convert the thermosetting phenol-formaldehyde resin binder component into an insoluble, infusible form, the improvement which comprises incorporating in the particulate dry-mix mold ingredients discrete mineral absorbent carrier selected from the group consisting of hydrated calcium silicate and diatomaceous earth and mixtures thereof containing from about 200 to 500% by weight of absorbed water, said mineral absorbent and absorbed water additament being added in amount of approximately 1 to 10% by weight of the total furnish.

10. Dry-mix mold ingredients for cold molding containing essentially an uncured thermosetting organic plastic binder and approximately 1 to 10% by weight of the total ingredients of an additament consisting essentially of discrete unreactive mineral absorbent carrier containing from about 100 to 500% by weight of absorbed water.

11. Dry-mix mold ingredients for cold molding containing essentially an uncured thermosetting organic plastic binder and approximately 1 to 10% by weight of the total ingredients of an additament consisting essentially of discrete unreactive mineral absorbent carrier selected from the group consisting of hydrated calcium silicate and diatomaceous earth and mixtures thereof containing from about 200 to 500% by weight of absorbed water.

12. Dry-mix mold ingredients for cold molding containing essentially an uncured thermosetting organic plastic binder and approximately 1 to 10% by weight of the total ingredients of an additament consisting essentially of discrete hydrated calcium silicate containing from about 200 to 500% by weight of absorbed water.

13. Dry-mix mold ingredients for cold molding containing essentially an uncured thermosetting organic plastic binder and approximately 3 to 6% by weight of the total ingredients of an additament consisting essentially of discrete hydrated calcium silicate containing from about 200 to 500% by weight of absorbed water.

References Cited in the file of this patent

UNITED STATES PATENTS

| | | |
|---|---|---|
| 2,064,410 | Bowen | Dec. 15, 1936 |
| 2,223,392 | Smith | Dec. 3, 1940 |
| 2,869,191 | Cooper et al. | Jan. 20, 1959 |
| 2,870,110 | Cooper et al. | Jan. 20, 1959 |
| 2,876,087 | Webber | Mar. 3, 1959 |
| 2,970,121 | Schmittberger | Jan. 31, 1961 |